A. A. WARNER.
ELECTRICALLY HEATED UTENSIL.
APPLICATION FILED FEB. 1, 1912.
1,043,487.
Patented Nov. 5, 1912.
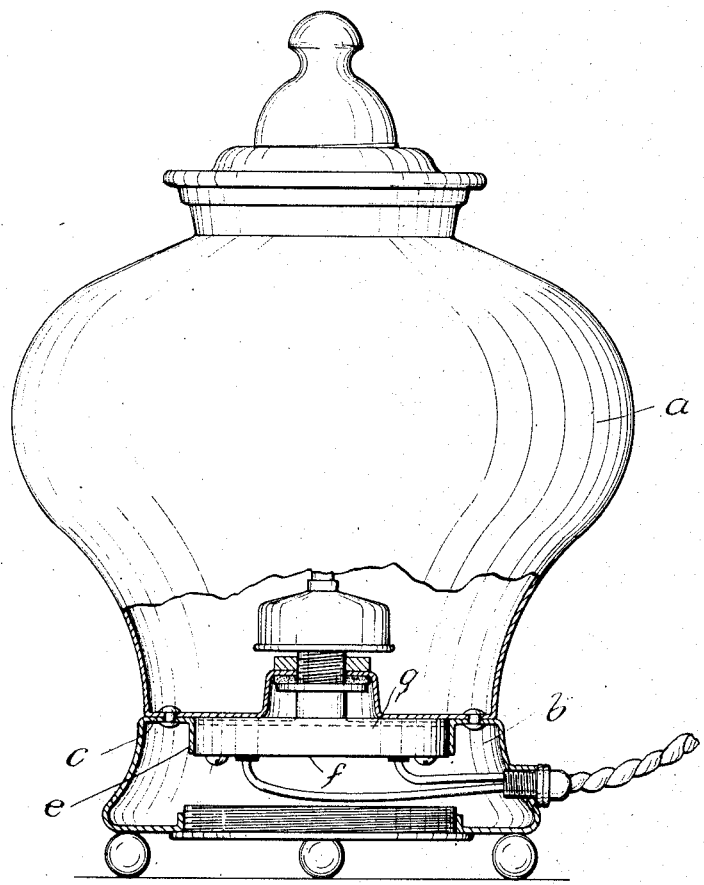
WITNESSES
INVENTOR
Alonzo A Warner:
BY
ATTORNEY

UNITED STATES PATENT OFFICE.

ALONZO A. WARNER, OF HARTFORD, CONNECTICUT, ASSIGNOR TO LANDERS, FRARY & CLARK, OF NEW BRITAIN, CONNECTICUT, A CORPORATION OF CONNECTICUT.

ELECTRICALLY-HEATED UTENSIL.

1,043,487. Specification of Letters Patent. Patented Nov. 5, 1912.

Application filed February 1, 1912. Serial No. 674,794.

*To all whom it may concern:*

Be it known that I, ALONZO A. WARNER, a citizen of the United States, and a resident of Hartford, in the county of Hartford and State of Connecticut, have invented certain new and useful Improvements in Electrically-Heated Utensils, of which the following is a specification.

The object of my invention is to produce a device having features of novelty and advantage.

The figure of the drawings represents in central vertical section part of a utensil in which my invention is embodied.

Referring to the drawings, $a$ denotes the utensil, and $b$ the base thereof having an inwardly extending flange $c$ and a depending circumferential wall $e$. The inwardly extending flange $c$ forms a support upon which the receptacle rests and the two are firmly secured together as by riveting or by soldering so as to provide for the rapid transmission of heat to the bowl of the utensil. Within the space inclosed by the circumferential wall $e$ is located a heating unit $f$, one member of which has a circumferential flange $g$, which contacts closely with the circumferential wall $e$ in order that the heat in the radiating member may be readily and freely transmitted to the wall $e$ and thence to the shell of the utensil.

I claim as my invention:

1. In an electrically heated utensil the combination with the shell of the utensil, of a base having an inwardly extending flange at its top upon which said shell rests and a depending wall at the inner edge of the flange, an electrical heating unit adapted to fit closely within said wall, and means for holding said unit in place.

2. In an electrically heated utensil the combination with the shell of the utensil, of a base having an inwardly extending flange at its top upon which said shell rests and a circular wall depending from the inner edge of the flange, an electrical heating unit adapted to fit closely within said wall, and means for holding said unit in place.

3. A base for an electrically heated utensil comprising a shell apertured at the top and having a depending wall of substantial depth, a utensil supported on said base and forming a closure for said aperture and a heating element closely fitting within the wall of said aperture and operatively positioned with respect to the utensil.

ALONZO A. WARNER.

Witnesses:
  H. A. TRANER,
  P. V. GUIBERSON.